United States Patent [19]

Selin et al.

[11] 4,036,934

[45] July 19, 1977

[54] PREPARATION OF NITRIC ACID

[75] Inventors: Clifford E. Selin, Salt Lake City, Utah; Wayne A. Proell, Seymour, Ind.; James M. Applegate, Granger, Utah

[73] Assignee: American Hydrocarbon Company, Salt Lake City, Utah

[21] Appl. No.: 693,137

[22] Filed: June 7, 1976

[51] Int. Cl.² .............................................. C01B 21/40
[52] U.S. Cl. .................................... 423/394; 23/260; 23/284
[58] Field of Search .................. 423/393, 394; 23/260, 23/284

[56] References Cited

U.S. PATENT DOCUMENTS

| 1,623,606 | 4/1927 | Toniolo | 423/394 |
| 2,028,402 | 1/1936 | Luscher | 423/393 |
| 3,714,333 | 1/1973 | Ohrui | 423/394 |

FOREIGN PATENT DOCUMENTS 1,248,311  10/1960  France

Primary Examiner—G. O. Peters

[57] ABSTRACT

DISCLOSED IS A TWO STAGE process AND APPARATUS for preparation of NITRIC AICD characterized by efficient use of heat liberated by the conversion of NITROGEN OXIDES TO NITRIC ACID.

3 Claims, 2 Drawing Figures

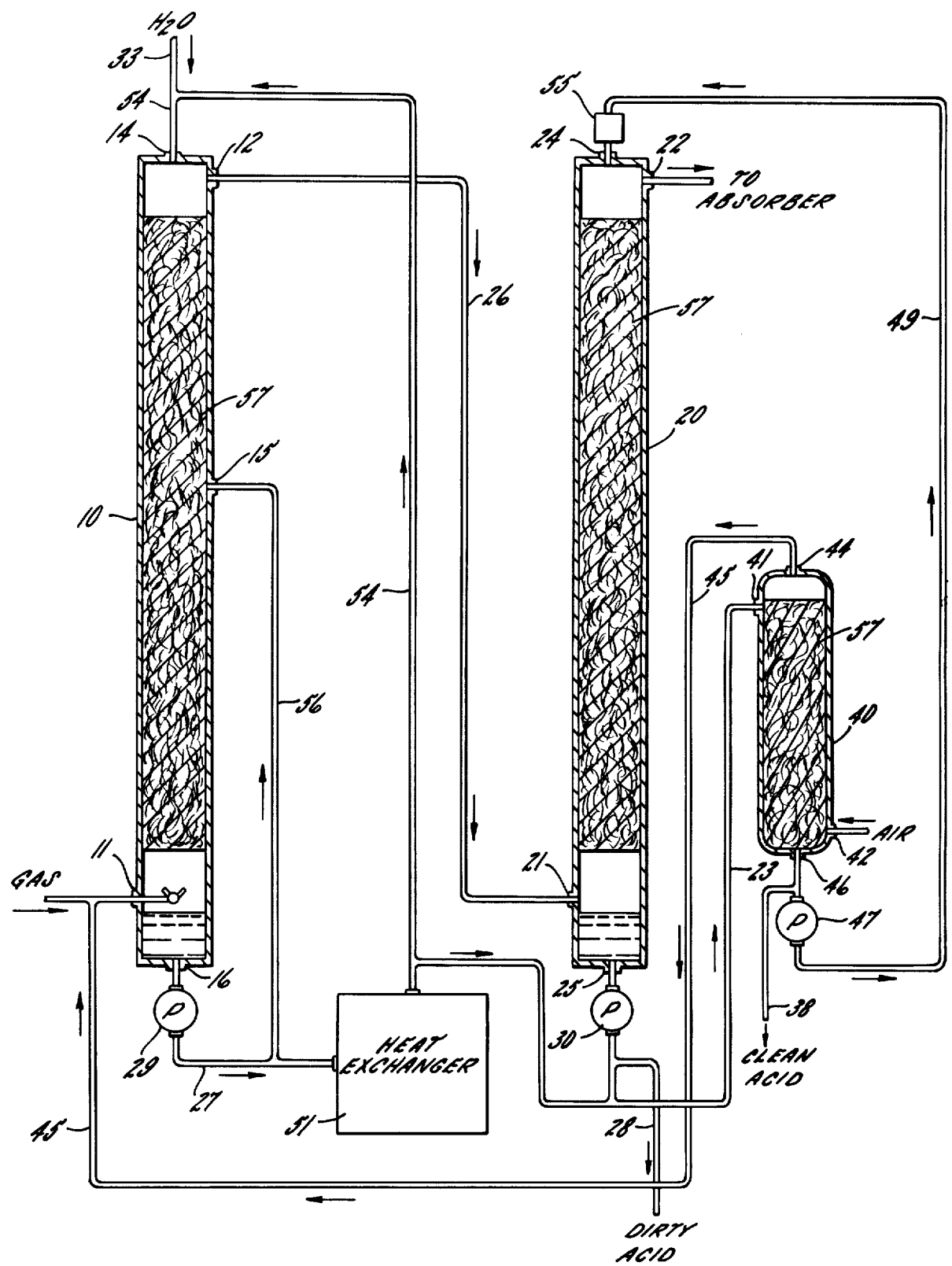

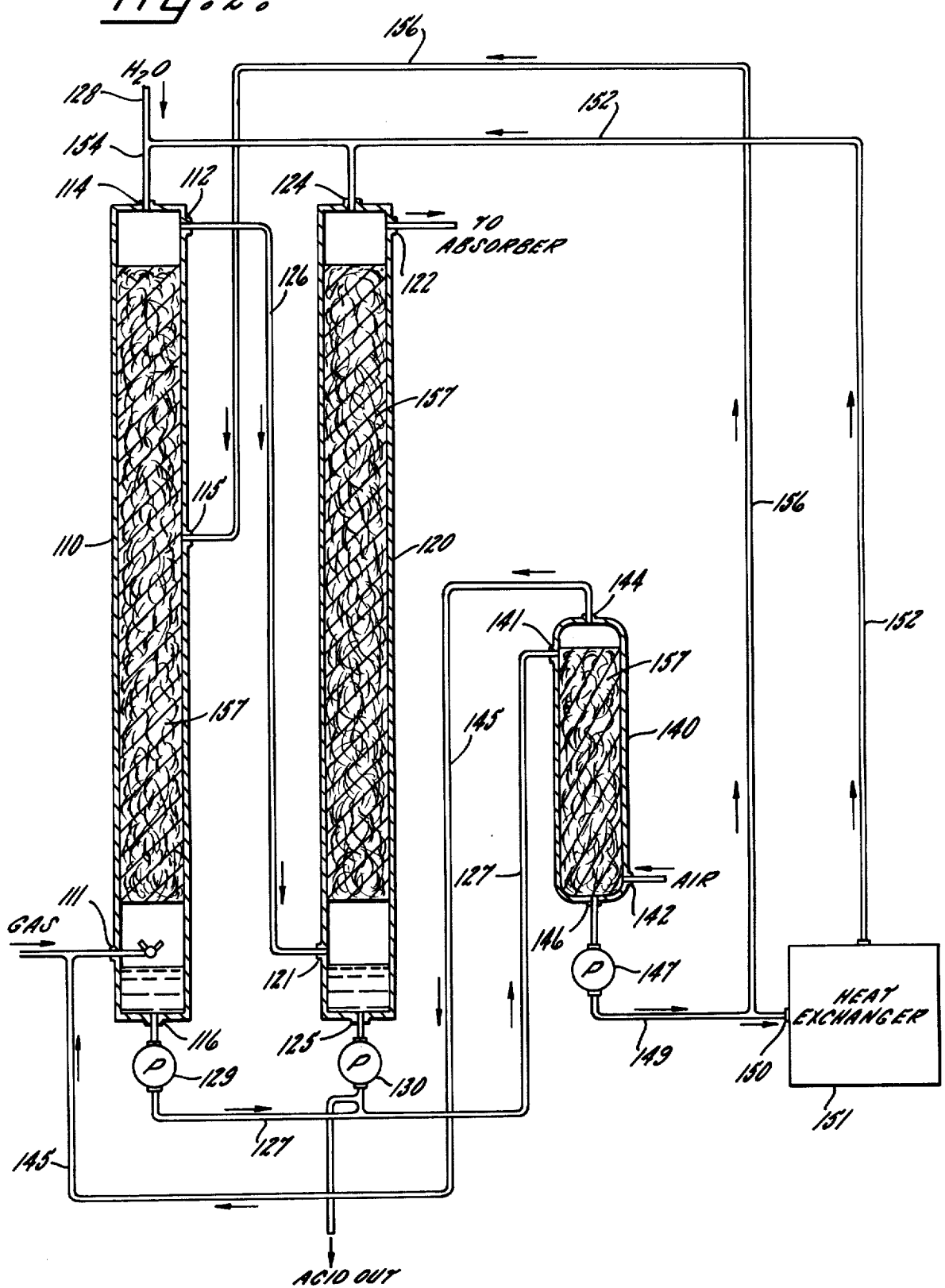

PREPARATION OF NITRIC ACID

This invention relates to an improvement in the preparation of nitric acid and, more particularly, to a new and novel reactor and a process for preparing nitric acid. The new and novel reactor and process of the present invention are characterized by an efficient use the heat liberated by the exothermic conversion of nitrogen oxides to nitric acid. In two copending applications Ser. No. 458,173 by Applegate et al. (filed Apr. 5, 1974) and Ser. No. 557,598 by Selin et al. (filed Mar. 12, 1975) there are described two atmospheric pressure processes for the preparation of nitric acid from nitrogen oxides, oxygen and water are disclosed. These processes represent a significant and clear departure from the previously employed atmospheric pressure nitric acid processes (as for example, that shown in Kirk-Othmer, *Encyclopedia of Chemical Technology*, Volume 13 at page 803 thereof) in that relatively small reactor volumes and single reaction zones are employed. The Applegate et al. and Selin et al. processes are able to use smaller reactor volumes than other atmospheric nitric acid processes since the nitrogen oxides are continuously concentrated in a single reaction zone by a combination of controlled absorption and desorption where these nitrogen oxides are continuously contacted in this single reaction zone with an aqueous stripping liquid, having a nitric acid content with a specified range to produce nitric acid of 50% concentrated and more.

Continuous concentration of the nitrogen oxides is effected by controlling the parameters of these processes, such as temperature within specified ranges so that three distinct regions are provided with the single reaction zone, viz--a stripper region, a concentration region and a desorber region. In the stripper region nitrogen oxides (principally nitric oxide) even in low concentrations, are extracted from reactor offgases and returned to the reaction zone, which becomes enriched in nitrogen oxides, for conversion to nitric acid. In the concentration region, the reactive nitrogen oxides continuously contact a liquid; and the nitrogen oxides are readily converted to nitric acid. In the desorbing region, nitrogen oxides dissolved in the liquid leaving the concentration region are extracted from this liquid and are returned to concentration region where they are readily converted to nitric acid.

While the Applegate et al. process is much simpler and represents a real economic advantage in capital equipment cost savings in comparison to the prior elevated pressure and atmospheric pressure nitric acid processes, it does require an investment in heating equipment since it is heat that is principally employed in the desorber region to extract the dissolved nitrogen oxides from the liquid leaving the concentration region. Further, as at least a part of this heated liquid is recycled to the reactor as the liquid utilized in the stripper region of the process to produce nitric acid the liquid must be cooled. The necessary cooling step also requires a further investment in capital equipment.

The Selin et al. process while it also represents a real significant advance over prior nitric acid processes, including the Applegate et al. process, also requires considerable investment in cooling equipment and, in addition, loses a significant amount of both the heat generated in the exothermic conversion of nitrogen oxides to nitric acid and the external heat utilized to desorb dissolved nitrogen oxides.

Accordingly, it is an object of this invention to provide an improved apparatus and process for preparing nitric acid which is characterized by an efficient use of the heat liberated by the exothermic conversion of nitrogen oxides to nitric acid.

Another object of this invention is to provide an apparatus and a process for preparing nitric acid which efficiently recovers both the heat liberated in the exothermic conversion of nitrogen oxides to nitric acid and the heat required to desorb the nitric acid product.

It is yet another object of this invention to minimize the investment in capital equipment required to cool the stripping liquid utilized to absorb unreacted nitrogen oxides from the reactor off-gases of a nitric acid reactor and return them to the reactor for conversion to nitric acid.

Yet another object of this invention is to provide such an improved apparatus and process which minimizes corrosion of the apparatus by effectively maintaining the lowest temperatures in the regions where the apparatus is exposed to the most corrosive liquids and vapors in the process.

Other objects and advantages of the present invention will become apparent upon reading the following detailed description and upon reference to the attached drawing.

BRIEF DESCRIPTION OF THE DRAWINGS

FIG. 1 is a diagrammatic view, sectioned vertically for clarity, of one embodiment of a reactor section. Constructed in accordance with the present invention and employing the process of the invention with the secondary or cooled reactor being run in a recycle mode.

FIG. 2 is a diagrammatic view, sectioned vertically for clarity, of a second embodiment of a reactor section wherein the embodying the apparatus and process of the present invention secondary or cooled reactor is being run in a one pass mode.

BRIEF DESCRIPTION OF THE INVENTION

The new apparatus and process herein described utilizes both a "hot" and a "cold" reactor each of which employs a stripper region, a concentration region and a desorber region. The utilization of both a "hot" and a "cold" reactor maximizes the energy recovery of the heat liberated in the conversion of nitrogen oxides to nitric acid by releasing this heat at as high a temperature as possible while at the same time minimizing the amount of nitrogen oxides lost to the atmosphere in the reactor off-gasses. As these nitrogen oxides can be converted to nitric acid product, this recovery of nitrogen oxides which would otherwise be lost to the atmosphere represents a real economic advantage of the apparatus and process of the present invention over existing nitric acid processes.

Specifically, the present invention employs the combination of a primary reactor, a secondary reactor and a reactor-desorber. In both the primary reactor and the secondary reactor various parameters, as for example, the gas feed inputs, amount of recycled stripper liquid and temperature of operation are controlled within predetermined limits so that in each reactor there is established a stripper region wherein nitrogen oxides are extracted from the reactor off-gases and returned to the reaction zone for conversion to nitirc acid; a concentration region wherein reactive nitrogen oxides are continuously contacted with aqueous nitric acid and converted to nitric acid product; and, a desorber region wherein nitrogen oxides dissolved in the liquid leaving the reaction zone are liberated and returned to the concentration zone for conversion to nitric acid. Further, the gas feed inputs, the mass flow of stripper liquid and the reactor packing (to be discussed in detail hereinafter) are also controlled to maximize the mass turbulence in the reactors, In fact, the mass turbulence should be such that the primary reactor is operated at nearly flooding.

According to one of the important aspects of the invention a reactor having a stripper region, a concentration region and a desorber region operated as a primary reaction zone at relatively high temperatures and with a relatively large temperature gradient is operated in combination with a second reactor also having a stripper region, a concentration region and a desorber region which operates as a secondary reaction zone at a relatively much lower temperature and with a relatively smaller temperature gradient. These reactors are being operated to maximize mass turbulence. While the same concentration of nitric acid is being continuously recycled and fed to the two reaction zones as a stripping liquid, the recycle to the primary reaction zone operated at the higher temperature is split into a relatively warm recycle stream at a temperature of about 170° F. The use of a split stream recycle maximizes the gas absorptive properties of a cold liquid countercurrently contacting the rising reactor off-gases while at the same time providing hot recycle liquid at the point where the majority of the reactive nitrogen oxides are converted to nitric acid--in the concentration zone of the primary reactor. It will be appreciated that the use of the split recycle stream of liquid to the primary reactor also results in an economic advantage since not all the recycle liquid to this reactor need be cooled by a heat exchanger.

Further, as the concentration of the acid in the primary reaction zone normally does not exceed about 33% nitric acid by weight the temperature of this reactor may be run at about 185° F. and higher without excessive corrosion of the reactor components or the breakdown of the nitric acid product in the presence of nitrogen dioxide to form nitric oxide. Also as the secondary reaction zone is run at relatively low temperatures, below about 135° F., even though the nitric acid in this reaction zone reaches concentrations of about 40% and higher there is little corrosion of the reactor components and virtually no breakdown of the nitric acid product to form nitric oxide.

In accordance with another important aspect of the invention a reactor stipper is also utilized to minimize the amount of nitrogen oxides dissolved in the nitric acid recycle to the secondary reaction zone so that a concentration region is established in this reaction zone. This reaction stripper desorbs dissolved nitrogen oxides from the reactor recycle liquid so that the reactor recycle liquid is vertically free of dissolved nitrogen oxides. This liquid will be a more powerful solvent for unreacted nitrogen oxides in the stripper regions of the two reactors.

While the invention is susceptible to various modifications and alternative forms, two preferred emobidments thereof have been shown in the drawing and will be described in detail hereinafter. In these embodiments, vertical towers are shown as the reaction zones. It should be understood, however, by those skilled in the art that it is not intended to limit the invention to the particular form disclosed, but, to the contrary, the intention is to cover all modifications, equivalents, and alternatives falling within the spirit and scope of the invention. For example, it should be appreciated that horizontal-oriented, gas-liquid contact apparatus as is known, may be employed in the place of the vertical apparatus of the preferred embodiment herein disclosed without departing from the scope of the present invention. In addition, while the embodiment illustrated sets forth a process wherein the nitrogen oxide reactant is formed as the first step of an integral process by oxidizing ammonia, this advantageous step need not be incorporated. Any source of nitrogen oxides may certainly be utilized.

DETAILED DESCRIPTION OF THE DRAWING

Turning to the drawings, there is shown in FIG. 1 an illustrative embodiment of a reactor section for carrying out the process of the present invention which is capable of producing one ton per day of nitric acid. In this emobidment, the secondary reactor is being run in a recycle mode. There is shown a vertically disposed tower reactor 10 of about 13 feet in height and 2 feet in diameter having a gas inlet 11 near its base, a gas outlet 12 located at the top of the tower, a liquid inlet 14 near the top of the tower, a second liquid inlet 15 located at about the midpoint of the tower and a liquid outlet 16 at the base of the tower.

There is also shown in the drawing a second vertically disposed tower reactor 20 which is approximately 12 feet in height and 1 foot in diameter. The second tower reactor 20 has a gas inlet 21 near its base, a gas outlet 22 near its top, a liquid inlet 24 at its top and a liquid outlet 25 at its base.

The gas outlet 12 in tower 10 is connected to the gas inlet 21 in tower 20 by means of a pipe 26. The liquid outlet 16 in tower 10 and liquid outlet 25 in tower 20 feed into pipes 27 and 23 after passing through pumps 29 and 30 respectively. Pipe 23 connects the liquid outlet 25 to a third vertically disposed tower 40 by means of liquid inlet 41 which is located near the top of tower 40. Tower 40 is about six feet in height and one foot in diameter and is further fitted with an air inlet 42 near its base, a gas outlet 44 at its top which is connected to gas inlet 11 in tower 10 by means of a pipe 45 and a liquid outlet 46 which after passing through pump 47 feeds into pipe 49. The liquid from tower 40 is pipe 49 passes through a conventional heat exchanger 55 where it is cooled and then feeds into the liquid inlet 24 in tower 20.

The liquid from tower 10 after passing through pump 29 into pipe 27 is split into two streams. One stream passes into pipe 56 which is connected to inlet 15 in tower 10. This stream serves as the hot recycle stream to this tower. The second stream passes into a conventional heat exchanger 51 where it is cooled to about 90° F. and returned through pipe 54 to outlet 14 in tower 10. This is the cold recycle stream to this reactor. The combination of the cold and hot recycle streams establish a temperature gradient in tower 10 which serves to establish a stripper region, a concentration region and a desorber region.

In this embodiment, product may be removed at two sites. First, if the product need not be stripped of unreacted dissolved nitrogen oxides, it may be removed just after pump 30 by means of a pipe 28. The concentration of the acid at this point is between about 33 to 45%. In a one ton per day plant the amount of 40% acid removed would be 227 pounds per hours. If the product is desired of be stripped of virtually all unreacted dissolved nitrogen oxides it may be removed from pipe 49 between pump 47 and heat exchanger 55 by means of pipe 38. The concentration of the nitric acid product at this point is between about 25 to 40%. In a one ton per day plant the amount of 33% acid removed would be 270 pounds per hour. Water is added to the reactor section through pipe 33 into pipe 54 in an amount equal to that removed with the product through pipes 28 or 38.

In FIG. 2 there is shown an illustrative embodiment of a reactor section for carrying out the process of the present invention wherein the secondary reactor is operated in a one pass mode. As with the embodiment shown in FIG. 1 the reactor section is capable of producing one ton per day of dry nitric acid. There is shown a vertically disposed tower reactor 110 of about thirteen feet in height and two feet in diameter having a gas inlet 111 near its base, a gas outlet 112 located at the top of the tower, a liquid inlet 114 near the top of the tower, a second liquid inlet 115 located at about the midpoint of the tower and a liquid outlet 116 at the base of the tower.

There is also shown in the drawing a second vertically disposed tower reactor 120 which is approximately twelve feet in height and one foot in diameter. The second tower reactor 120 has a gas inlet 121 near its base, a gas outlet 122 near its top, a liquid inlet 124 at its top and a liquid outlet 125 at its base.

The gas outlet 112 in tower 110 is connected to the gas inlet 121 in tower 120 by means of a pipe 126. The liquid outlet 116 in tower 110 and liquid outlet 125 in tower 120 both fed into pipe 127 after passing through pumps 129 and 130 respectively. Pipe 127 connects the liquid outlets 116 and 125 to a third vertically disposed tower 140 by means of liquid inlet 141 which is located near the top of tower 140. Tower 140 is about six feet in height and one foot in diameter and is further fitted with an air inlet 142 near its base, a gas outlet 144 at its top which is connected to gas inlet 111 in tower 110 by means of a pipe 145 and a liquid outlet 146, which after passing through pump 147, feeds into pipe 149. The liquid from tower 140 in pipe 149 is split into two streams. One stream passees through pipe 150 into a conventional heat exchanger 151 where it is cooled and then into pipe 152 which is connected to liquid inlet 114 in tower 110 and liquid inlet 124 in tower 120 by means of pipes 154 and 155 respectively. The second stream by-passes heat exchanger 151 and passes through pipe 156 and into tower 110 by means of liquid inlet 115. In this embodiment nitric acid product containing some unreacted dissolved nitrogen oxides is removed through a pipe 123 which is between pump 130 and pipe 127. The concentration of this acid is between about 33 to 45%. In a 1 ton per day plant the amount of 40% acid removed is about 227 pounds per hour. Make up water is added to the reactor section by means of pipe 128 which feeds into pipe 154. The amount of water added should be equal to the amount removed with the product through pipe 123.

Turning to the reaction of nitrogen oxides and water to form nitric acid in the embodiment shown in the FIG. 1, reactive nitrogen oxides at a temperature of 300° F., obtained for example from an ammonia oxidation burner (not shown), are fed at a rate of 339 pounds per hour (10.5 volume%NO) into tower 10 through inlet 11. There is a temperature gradient in tower 10. The bottom of the tower is maintained at about 185° F. and the top of the tower is maintained at 90° F. Nitric acid at a concentration of between about 15 to 35%, preferably about 33%, is fed into the tower 10 through inlets 12 and 15 at a rate sufficient to maintain a predetermined level of the acid in the bottom of reactor 10. In the case of a one ton per day plant this is at a rate of 2465 pounds per hour. The liquid is introduced in the form of a spray or as small droplets and optimum gas-liquid contact to insure adequate mass transfer in the tower reactor is accomplished by situating in the tower 10, as well as in the reactor tower 20 and stripper reactor 40 a packing (designated as 57) or the like providing a relatively large surface area. Any inert packing providing a relatively large surface area and having a high void content may be utilized, as for example, conventional bubble plates, glass Raschig rings, Berl saddles or stainless steel shavings. Preferably, stainless steel shavings are employed since it has been found that the highest yields of nitric acid may be obtained therewith.

By maintaining the temperature of the liquid entering tower 10 through inlet 12 at about 90° F. and the temperature of the liquid entering tower 10 through inlet 15 at about 185° F. there is established a temperature gradient in the tower 10 (the temperature at the top of tower 10 being about 90° F. and the temperature at the bottom of tower 10 being about 185° F.) which serves to establish a stripper region, a concentration region and a desorber region in the tower. The unreacted nitrogen oxides are retained by the liquid entering through inlet 12 in the stripping region and purged by the heat liquid in the desorbing region to concentrate these unreacted nitrogen oxides in the concentration region where they will be converted to nitric acid product.

The nitric acid produced in tower 10 exits through outlet 16 and is pumped by means of a conventional pump 29 into line 23 where it is split into two streams. One stream passes into line 56 where it is returned to tower 10 through inlet 15. A second stream passes into heat exchanger 53 where it is cooled to about 90° F. and returned to tower 10 through inlet 14. A portion of the cooled acid is fed into pipe 24 and into tower 40. It has been found that about 65 to about 70% of the nitric acid produced in the herein described section is produced in tower 10, which is sometimes referred to as the "hot" reactor. The concentration of the acid product leaving tower 10 has been enriched to a concentration of about 35%. Gases exit tower 10 through outlet 12 and pass through line 26 into tower 20 through inlet 21. These gases, even though they have been contacted countercurrently with about 15 to 30% nitric acid at a temperature of about 90° F., still contain some unreacted nitrogen oxides. These unreacted nitrogen oxides are converted to additional nitric acid product in tower 20. As heretofore mentioned reactive gases enter tower 20 through inlet 21 and nitric acid at a concentration of between about 35 to 45% is introduced into the tower 20 through inlet 24. This nitric acid has been virtually stripped free of any dissolved nitrogen oxides in the stripper reactor 40 so that it is a powerful solvent for nitrogen oxide vapors. The descending nitric acid countercurrently contacts the ascending vapors in the packed tower 20 and the nitric acid dissolved the unreacted nitrogen oxides. The bottom of the tower 20 is run at a slightly higher temperature than the top of the tower (about 110° F. vs about 90° F.) so that a slight temperature gradient exits in tower 20. It is the combination of this temperature gradient and the introduction of the virtually nitrogen oxide-free liquid into the reactor which establishes a stripper region and a concentration region in the reactor 20. Nitrogen oxide rich nitric acid product which has been enriched in its nitric acid content exits tower 20 through outlet 25 where it is pumped by means of pump 30 through inlet 27 into stripper reactor 40 through inlet 41. The concentration of this nitric acid is about 40%. As the tower 20 is run at temperatures of only about 100° F. the nitric acid does not tend to corrode the reactor components. Gases exit reactor 20 through outlet 22 and can be further processed into nitric acid by means of an absorber system (not shown).

The tower 40 is an important feature of this invention for it serves to strip dissolved nitrogen oxides from the nitric acid product. This nitrogen-oxide free nitric acid can then be recovered as final product through line 38 and also can be used as the stripping liquid in tower 20 reactor and 20. Liquid rich in dissolved nitrogen oxides from towers 10 and 20 is introduced into tower 40 through inlet 41. Tower 40, like towers 10 and 20, is packed with packing 57. Air is introduced into tower 40 through inlet 42. The tower 40 is operated at a temperature of about 110° F. The descending liquid rich in dissolved nitrogen oxides countercurrently contacts the ascending heated air and the dissolved nitrogen oxides are extracted from the liquid by the heated air as vapors. The air and desorbed nitrogen oxides exit tower 40 through outlet 44 and return to tower 10 by means of line 45 where they are mixed with feed gas and introduced in tower 10 with the feed gas by means of inlet 11. The nitric acid, now virtually free of dissolved nitrogen oxides, exits tower 40 through outlet 46 and is pumped by means of pump 47 into line 49. In line 49 the nitric acid stream passes into heat exchanger 51 where it is cooled to about 90° F. This is an important feature of the invention since this heat exchanger and heat exchanger 53 remove virtually all the exothermic heat of reaction from the reactors 10 and 20 and thus reduce the possibility of heat loss.

After passing through heat exchanger 51, the virtually nitrogen oxide-free nitric acid passes through line 49 and back into reactors 20 through inlet 24. This recycled nitric acid is a powerful solvent for unreacted nitrogen oxide vapors and functions as a stripping liquid in tower 20. As heretofore mentioned, the cooled, virtually nitrogen oxide-free nitric acid stripping stream helps to establish the concentration region in tower 20. Product can also be removed from the system through line 28 at a point just after pump 30. This acid product would contain unreacted dissolved nitrogen oxides and is between 33 and 45%. In a 1 ton per day plant the amount of 40% nitric acid removed would be 227 pounds per hour.

We claim as our invention:

1. A continuous process for the preparation of nitric acid comprising:
   a. providing a primary reaction zone, a secondary reaction zone and a desorber zone, said primary reaction zone and said secondary reaction zone each having a stripper region, an intermediate concentration region and a gas liberating region;
   b. continuously introducing a first stream of aqueous nitric acid containing from about 15 to about 35% at a temperature below about 90° F. into the top of said stripper of said primary reaction zone and continuously introducing a second stream of aqueous nitric acid containing from about 15 to about 35% nitric acid at a temperature in the range of about 150° to about 185° F. into said stripper zone of said primary reaction zone, the rate of introduction of said first stream and said second stream of nitric acid being sufficient to allow maintenance of a predetermined temperature of between about 150° to 185° F. in said gas liberating region of said primary reaction zone;
   c. providing a gas seal in said gas liberating region of said primary reaction zone;
   d. continuously introducing gaseous ammonia oxidation products including nitrogen oxides and a gaseous oxidizing agent including molecular oxygen into said concentration zone of said primary reactor;
   e. reacting the nitrogen oxides and the oxidizing agent in the presence of said first stream in said primary reactor at a temperature below about 90° F. to produce gaseous reaction products including nitrogen dioxide and liquid reaction products including nitric acid which combine with said first stream to enrich the nitric acid content thereof and reacting the ammonia oxidation products and the oxidizing agent in the presence of said second stream in said primary reactor at a temperature of between 120° and about 185° F. to produce gaseous reaction products including nitrogen dioxide and liquid reaction products including nitric acid which combine with said seecond stream to enrich the nitric acid content thereof;
   f. maintaining the temperature of said first stream as it passes through the stripper region below about 90° F. to dissolve at least a major amount of the gaseous reaction products entering the stripper region into said first stream;
   g. combining said enriched first stream and said enriched second stream;
   h. withdrawing said enriched first stream and said second stream of aqueous nitric acid from said reaction zone at a rate allowing maintenance of said predetermined temperature of between about 150° to 185° F. to thereby liberate nitrogen oxides dissolved in said combined streams;
   i. continuously separating said combined enriched first and second stream of aqueous nitric acid into a first and a second recycle stream;
   j. continuously introducing said first recycle stream into said stripper zone of said primary reaction zone to provide said second stream;
   k. continuously cooling said second recycle stream to a temperature of at least about 90° F;
   l. continuously separating said second recycle stream at a temperature of at least about 90° F. into a first cooled recycle stream and a second cooled recycle stream;
   m. continuously introducing said first cooled recycle stream into the top of said stripper region of said primary reactor to provide said first stream;
   n. continuously introducing said second cooled recycle stream into a desorbing zone spacially removed from said first primary reaction zone;
   o. contacting said second cooled recycle stream in said desorber zone with a gas at a temperature of between about 70 to about 85° F. in an amount sufficient to liberate a major amount of the dissolved gaseous reaction products therein;

p. continuously introducing said liberated gaseous reaction products and said contacting gas into said primary reaction zone;

q. withdrawing a desorbed second liquid recycle stream from the liquid in the desorbing zone and separating said desorbed liquid into a product stream and a desorbed recycle stream;

r. cooling said desorbed recycle stream to a temperature of at least about 90° F.;

s. continuously introducing said cooled desorbed recycle stream into the top of said stripping region of said secondary reaction zone to provide a cooled, desorbed stripping liquid therein;

t. withdrawing the remaining gaseous reaction products from said stripper region of said primary reactor and introducing said gaseous reaction products into said concentration zone of said secondary reaction zone;

u. reacting said liberated gaseous reaction products in the presence of said stripping liquid in said secondary reaction zone to produce liquid reaction products including nitric acid which combines with said stripping liquid to enrich the nitric acid content thereof;

v. withdrawing said nitric acid enriched stripping liquid and combining said nitric acid enriched stripping liquid with said cooled second recycle stream; and w. adding water to said stripping zone of said primary reactor, the amount and rate of water added, and product stream separated, being coordinated to provide said first stream introduced into the top of said stripper region of said primary reaction zone with a nitric acid concentration in the range of about 15 to 35% by weight.

2. A continuous process for the preparation of nitric acid comprising:

a. providing a primary reaction zone, a secondary reaction zone and a desorber zone, said primary reaction zone and said secondary reaction zone each having a stripper region, an intermediate concentration region and a gas liberating region;

b. continuously introducing a first stream of aqueous nitric acid containing from about 15 to about 35% at a temperature below about 90° F. into the top of said stripper of said primary reaction zone and continuously introducing a second stream of aqueous nitric acid containing from about 15 to about 35% nitric acid at a temperature in the range of about 150° to about 185° F. into said stripper zone of said primary reaction zone, the rate of introduction of said first stream and said second stream of nitric acid being sufficient to allow maintenance of a predetermined temperature of between about 150° to about 185° F. in said gas liberating region of said primary reaction zone;

c. providing a gas seal in said gas liberating region of said primary reaction zone;

d. continuously introducing gaseous ammonia oxidation products including nitrogen oxides and a gaseous oxidizing agent including molecular oxygen into said concentration zone of said primary reactor;

e. reacting said nitrogen oxides and the oxidizing agent in the presence of said first stream in said primary reactor at a temperature below about 90° F. to produce gaseous reaction products including nitrogen dioxide and liquid reaction products including nitric acid which combine with said first stream to enrich the nitric acid content thereof and reacting the ammonia oxidation products and the oxidizing agent in the presence of said second stream in said primary reactor at a temperature of between 120° and about 185° F. to produce gaseous reaction products including nitrogen dioxide and liquid reaction products including nitric acid which combine with said second stream to enrich the nitric acid content thereof;

f. maintaining the temperature of said first stream as it passes through the stripper region below about 90° F. to dissolve at least a major amount of the gaseous reaction products entering the stripper region into said first stream;

g. combining said enriched first stream and said enriched second stream;

h. withdrawing said enriched first stream and said second stream of aqueous nitric acid from said reaction zone at a rate allowing maintenance of said predetermined temperature of between about 150° to 185° F. to thereby liberate nitrogen oxides dissolved in said combined streams;

i. continuously separating said combined enriched first and second stream of aqueous nitric acid into a first and a second recycle stream;

j. continuously introducing said first recycle stream into said stripper zone of said primary reaction zone to provide said seecond stream;

k. continuously cooling said second recycle stream to a temperature of at least about 90° F;

l. continuously separating said second recycle stream at a temperature of at least about 90° F. into a first cooled recycle stream and a second cooled recycle stream;

m. continuously introducing said first cooled recycle stream into the top of said stripper region of said primary reactor to provide said first stream;

n. continuously introducing said second cooled recycle stream into a desorbing zone spacially removed from said first primary reaction zone;

o. contacting said second cooled recycle stream in said desorber zone with a gas at a temperature of between about 70° to about 85° F. in an amount sufficient to liberate a major amount of the dissolved gaseous reaction products therein;

p. continuously introducing said liberated gaseous reaction products and said contacting gas into said primary reaction zone;

q. withdrawing a desorbed second liquid recycle stream from the liquid in the desorbing zone to provide a desorbed recycle stream;

r. cooling said desorbed recycle stream to a temperature of less than about 90° F.;

s. continuously introducing said cooled desorbed recycle stream into the top of said stripping region of said secondary reaction zone to provide a cooled, desorbed stripping liquid therein;

t. withdrawing the remaining gaseous reaction products from said stripper region of said primary reactor and introducing said gaseous reaction products into said concentration zone of said secondary reaction zone;

u. reacting said liberated gaseous reaction products in the presence of said stripping liquid in said secondary reaction zone to produce liquid reaction products including nitric acid which combines with said stripping liquid to enrich the nitric acid content thereof; and to provide a gas seal in secondary reaction zone v. withdrawing said nitric acid enriched stripping liquid and separating it into a product stream and an enriched recycle stream and combining said enriched recycle stream with said cooled second recycle stream; and w. adding water to said stripping zone of said primary reactor, the amount and rate of water added, and product stream separated, being coordinated to provide said first stream introduced into the top of said stripper region of said primary reaction zone with a nitric acid concentration in the range of about 15 to 35% by weight.

3. Apparatus for preparing nitric acid, said apparatus comprising the combination of a. a vertically disposed, elongated primary tower reactor packed with an inert packing and having a gas inlet near the bottom of said primary tower reactor, a gas outlet near the top of said primary tower reactor, a first liquid inlet at the top of said primary tower reactor, a second liquid inlet near the midpoint of said primary tower reactor, and a liquid outlet near the bottom of said primary tower reactor;

b. a vertically disposed, elongated secondary reactor tower, packed with an inert packing having a gas inlet near the bottom of said secondary tower reactor, a gas outlet near the top of said secondary tower reactor, a liquid inlet at the top of said secondary tower reactor and a liquid outlet at the bottom of said secondary tower reactor;

c. a vertically disposed, elongated desorbing tower packed with an inert packing having a liquid inlet near the top of said desorbing tower, a liquid outlet at the bottom of said desorbing tower, a gas inlet near the bottom of said desorbing tower and a gas outlet at the top of said desorbing tower;

d. a primary heat exchanger;

e. a secondary heat exchanger;

f. means for withdrawing liquid from the liquid outlet in said primary tower reactor and introducing it into said primary heat exchanger and said second liquid inlet in said primary reactor tower;

g. means for withdrawing liquid from the liquid outlet in said secondary tower reactor and introducing it into the liquid inlet in said desorbing tower;

h. means for withdrawing liquid from the liquid outlet in said desorbing tower and separating said liquid into a product stream and a recycle stream;

i. means for introducing said recycle stream into said secondary heat exchanger;

j. means for withdrawing liquid from said secondary heat exchanger and introducing it into the liquid inlet in said secondary tower reactor;

k. means for introducing a gas into said gas inlet of said desorbing tower;

l. means for withdrawing gas from the gas outlet of said desorbing tower and introducing it into said gas inlet of said primary tower reactor;

m. means for withdrawing liquid from said primary heat exchanger and separating said liquid into a first recycle stream and a second recycle stream;

n. means for introducing said first recycle stream into said first liquid inlet of said primary reactor;

o. means for combining said second recycle stream with the liquid withdrawn from the liquid outlet of said secondary tower reactor; and p. means for adding water to the liquid introduced into the first liquid inlet in said first tower reactor.

* * * * *